Dec. 26, 1950 — L. HEIDGER — 2,535,414
MATERIAL SPREADER
Filed Sept. 6, 1946 — 2 Sheets-Sheet 1

INVENTOR.
LEONARD HEIDGER
BY John W. Michael
ATTORNEY.

INVENTOR.
LEONARD HEIDGER
BY John W. Michael
ATTORNEY.

Patented Dec. 26, 1950

2,535,414

UNITED STATES PATENT OFFICE 2,535,414

MATERIAL SPREADER

Leonard Heidger, Hales Corners, Wis., assignor to R. O. Coburn, O. A. Coburn, and D. A. Coburn, doing business as Coburn Manufacturing Company, Whitewater, Wis.

Application September 6, 1946, Serial No. 695,237

5 Claims. (Cl. 275—8)

This invention relates to improvements in material spreaders and particularly spreaders designed for the distribution of lime or other chemicals in the gutters and on the floors of dairy barns.

The health laws of many States require the use of chemicals to disinfect dairy barns and absorb unpleasant odors. This usually requires the scattering of chemicals such as lime on the floors and in the gutters. Heretofore this has been done manually with shovels and the like, a process which consumes considerable time and labor and which creates an undesirable dusty condition. Due to the chemically active nature of the material to be scattered, the scatterer or spreader must resist corrosive action and clogging, be light and easily maneuverable, and protect the operator from contact with the chemical.

It is, therefore, an object of this invention to provide a scatterer for lime or other chemicals which will store a supply of the substance to be scattered and will agitate such supply during operation to prevent clogging thereof.

Another object of the invention is to provide a spreader which will direct the material scattered in a desired direction and prevent it from coming in contact with the operator.

Another object of the invention is to provide a scatterer in which the parts contacting the chemicals to be spread will resist corrosive action and yet be sufficiently rugged to withstand the type of rough usage customarily accorded such implements.

Another object of the invention is to provide a scatterer which is so balanced that no great effort is required of the operator.

A still further object of the invention is to provide a spreader which is of simple construction and easily operated and maneuvered.

These objects are accomplished by providing a frame, mounted on a single traction wheel, which supports a valved hopper above such wheel. Between the hopper and wheel there is a rotary spreading disk while in the hopper there is an agitator. A drive shaft geared to the wheel provides rotative power for the disk and vibratory movement for the agitator. Thus the weight of the filled hopper is mounted directly over the axis of the wheel to make good balance and a single drive shaft motivates both the agitator and the spreading disk to simplify construction and operation. The hopper, agitator, disk and driving gears for the shaft are preferably made of aluminum alloy and the shaft is preferably made of brass in order to resist the corrosive action of the lime or other chemical being spread. A shield extends around the rear half of the spreading area of the disk to prevent any discharge of material to the rear of the spreader, thus keeping such material from being directed on to the operator.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Figures 1, 2, 4:
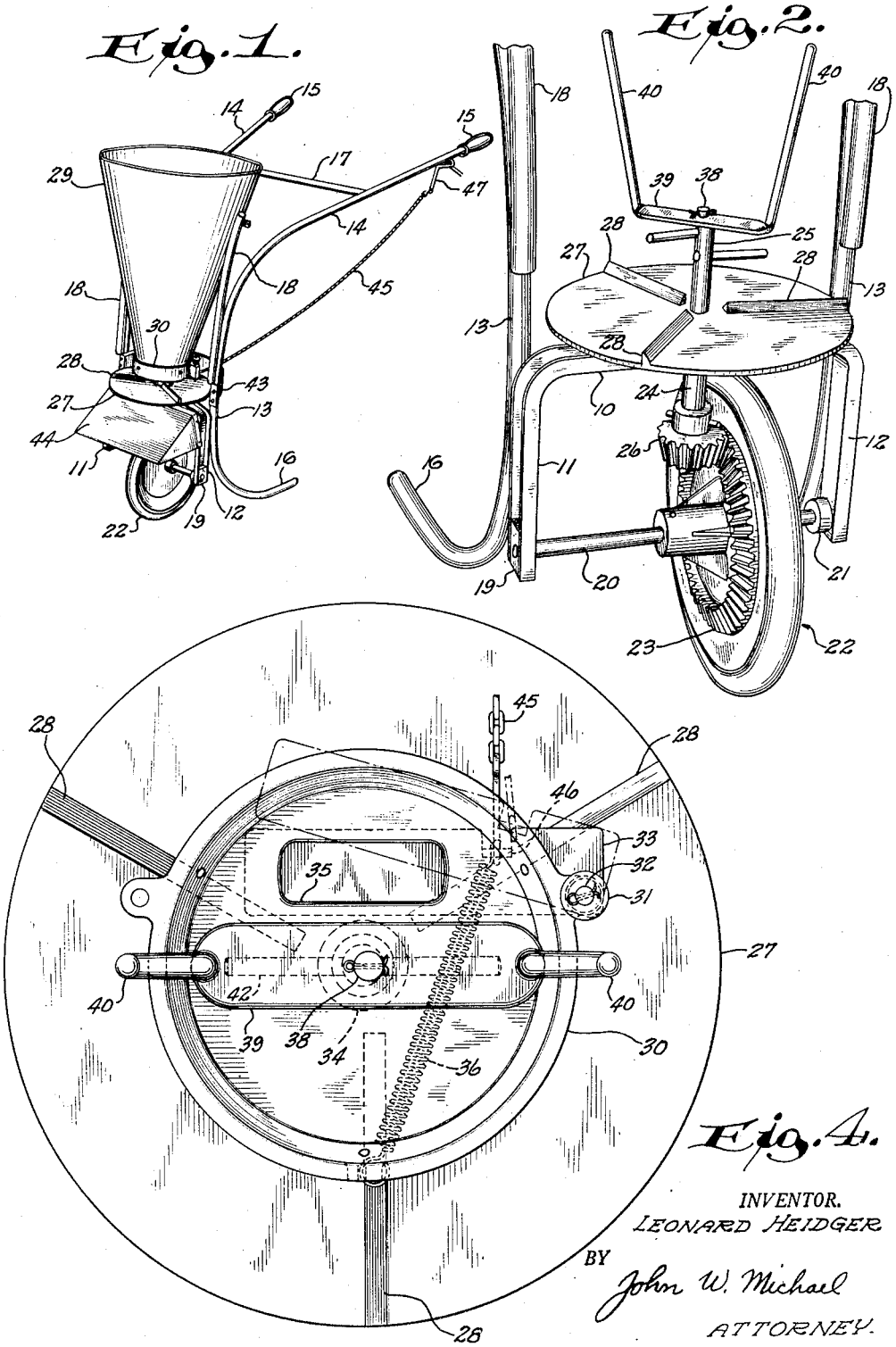
Fig. 1 is a perspective view of a lime spreader embodying the present invention.
Fig. 2 is an enlarged fragmentary, perspective view of the material spreader viewed in Fig. 1 with the hopper and shields removed for sake of clarity in illustration.
Fig. 4 is an enlarged fragmentary top plan view of the parts viewed in Fig. 3 with the hopper removed.
Figure 3:
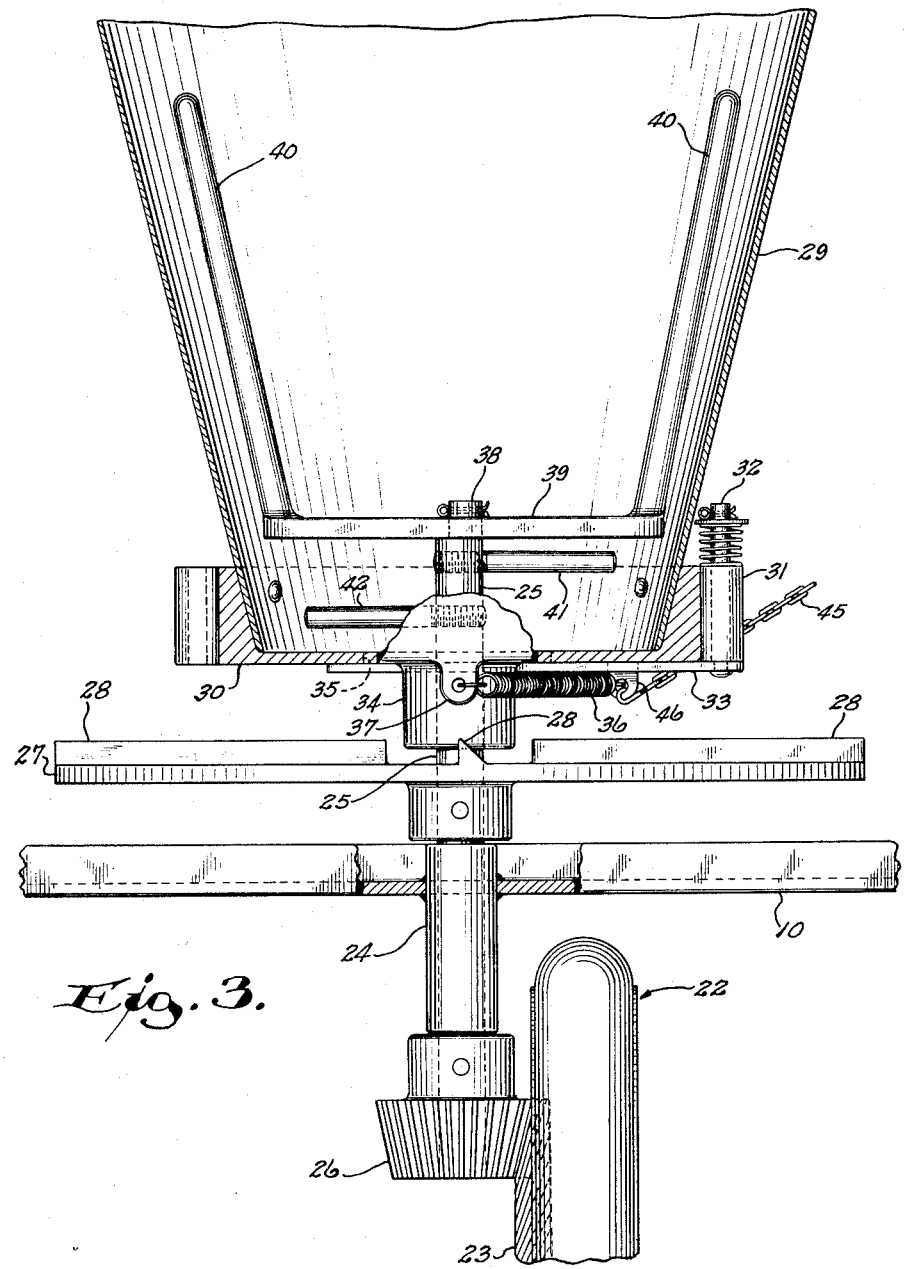
Fig. 3 is an enlarged fragmentary view, partly in section and partly in side elevation, of the hopper, agitator, hopper bottom, discharge valve, spreading disk, and traction wheel drive, all related parts of the material spreader embodying the present invention.

Referring to the drawings by reference numerals, the material spreader comprises generally a frame, a single traction wheel which supports the frame, a spreading disk positioned above the traction wheel, and a hopper from which material is discharged to the spreading disk. The frame consists of a steel channel formed to provide a bridge 10 and depending legs 11 and 12. The means for manipulating and directing the operation of the spreader and holding it in stationary upright position comprise a pair of tubular members 13, one of which is secured to each of the legs 11 and 12 by a weld or other fastening means. These members have upwardly and outwardly extending arms 14 at the end of which are provided hand grips 15. The members 13 also have downwardly and outwardly extending legs 16 which engage the ground to support the spreader in the upright position shown in Fig. 1. To insure more rigidity of the arms 14, a brace 17 preferably extends therebetween. Secured to the members 13 are a pair of upright supports 18 which flare outwardly in order to engage and support the hopper.

Each of the legs 11 and 12 is provided with axle bearings 19 in which is rotatably mounted a brass axle 20. The axle 20 is restrained from longitudinal movement in one direction with respect to the bearings 19 by a collar 21 which bears against the inner wall of leg 12, and in the other direction by engagement between the gears 23 and 26. A disk-type traction wheel 22 formed of aluminum and provided with a rubber tire is rigidly mounted on the axle 20. The wheel 22 has its hub provided with a driving bevel gear 23 preferably in the form of an aluminum casting. Welded in place centrally to the bridge 10 is a tubular metal shaft bearing 24. In this bearing is rotatably mounted a brass shaft 25 which has rigidly secured to its lower end by a pin a cast aluminum driven bevel gear 26. The gear 26 meshes with the driving gear 23 and is maintained in proper driving association with such gear by the bearing 24 which is sufficiently long to abut against the hub of the gear 26 to prevent the shaft from having upward longitudinal movement. Immediately above the bridge 10 is a spreading disk 27. It is rigidly secured to the shaft 25 by a taper pin and its hub abuts against the upper end of the bearing 24 to keep the shaft 25 from having longitudinal movement downwardly. The disk 27 is preferably provided with radially extending upwardly projecting ridges 28, the purpose of which is to cause material dropped on said disk to be thrown by centrifugal force radially from the disk. From the description thus far it will be seen that upon forward movement of the spreader the traction and supporting wheel 22 will cause the disk 27 to rotate rapidly in a clockwise direction as viewed in Figs. 1 and 2.

In order to continually feed to the disk 27 a supply of material to be spread, there is provided a hopper consisting of an inverted cone-shaped body 29 preferably formed from sheet aluminum. The hopper 29 is secured by bolts, or other fastening means, to the supports 18 so as to be directly above the spreading disk 27. The bottom of the hopper is preferably an aluminum casting 30 into which the lower marginal edges of the hopper 29 fit and to which they are secured by rivets or other well-known devices. The casting 30 at one side has a projection 31 provided with an opening to receive a pin 32 for pivotally holding a shutter valve 33. The bottom 30 has a centrally positioned, downwardly projecting hub 34 which contains an opening to rotatably receive the upper portion of the shaft 25. The bottom 30 also has a rectangularly shaped discharge opening 35 which is closed by the shutter valve 33. The shutter valve is normally maintained in closed position by a tension spring 36 extending between the valve to a small apertured projection 37 formed on the bottom 30. A chain 45, secured to a lip 46 on the shutter 33, extends to a lever 47 carried adjacent one of the handles 15. When the lever 47 is gripped in the hand of the operator it pivots and pulls the chain 45 so that the valve 33 is moved against the tension of spring 36 to the open position, as shown in the broken lines of Fig. 4. The upper end of the brass shaft 25 projects upwardly through the bottom 30 into the lower portion of the hopper 29. Its upper end is provided with an eccentric 38 which is formed by turning down a small extension of the shaft with an axis offset from the axis of the shaft. On the eccentric 38 there is mounted an agitator 39 consisting of a cast aluminum member having a bottom portion extending substantially across the interior of the hopper and two upwardly extending fingers 40 positioned at its ends and somewhat paralleling the sloping inner sides of the hopper. A cotter pin holds the agitator 39 on the eccentric 30 so that it has free rotative movement relative to the eccentric and the shaft. However, as the shaft is rotated the agitator 39 also has a positive wobbling or vibrating movement and a gradual rotative movement. The rate of such rotative movement depends entirely upon the consistency and resistance of the material in the hopper as it is caused only by the friction between the eccentric 38 and the agitator 39. In order to continually feed the material in the hopper to the discharge opening 35 the shaft 25 is preferably provided with radially extending brass fingers 41 and 42. These fingers are threaded into or otherwise secured to that portion of the shaft below the agitator and above the bottom of the hopper and upon rotation of the shaft urge material toward the discharge opening.

In order to direct material from the spreader disk forwardly and to either side of the spreader, and to prevent such material from being discharged rearwardly of the spreader where it would contact the operator, a metal shield 43 is secured to the tubular members 13 and extends rearwardly around and closely adjacent the perimeter of the disk 27. This shield prevents material discharged through the opening 35 from being thrown radially from the disk throughout the rear half of its scope of operation. To prevent material from discharging and collecting on the traction wheel disk and clogging the gears 23 and 26, a roof 44 is secured to the bridge 10 and legs 11 and extends from underneath the spreader disk 27 sufficiently forward thereof to give the required protection.

The material spreader as herein described is particularly adaptable for use in spreading lime and other chemicals on the floors and in the gutters of dairy barns. Its simple construction permits the use of materials such as brass or aluminum which resist the corrosive action of the chemicals. The spreader may be left with the hopper filled and ready for immediate action. To spread the chemical, the operator need only grasp the handles 15 and propel the spreader forwardly on the wheel 22. At this time the material in the hopper is broken up by the agitating action of the agitator 39 and fingers 41, 42 so as to be readily available at the discharge opening 35. Upon the opening of the valve 33 by the action of the hand-lever 47, the material in the hopper falls through the opening 35 to the upper side of the spreading disk 27 by which it is ejected over a fan-like area to the front and sides of the spreader for a distance of substantially four or five feet. Thus a farmer, for example, need only walk down the aisle of his dairy barn to spread the lime or other chemical on the floor of that aisle and into the gutters adjacent the aisle. As the spreading takes place from a low height, hardly any dust will be created. It should be noted that since the hopper is positioned substantially above the axle 20, little or no force will be required to carry the weight (twenty-five to thirty-five pounds) of material in the hopper.

While the embodiment specifically described herein is particularly adapted for the spreading of lime and other chemicals, it may also be used for spreading fertilizer and seed.

Although only one embodiment of the invention is shown and described herein, it will be understood that this application is intended to cover such changes or modifications as come within the spirit of the invention or scope of the following claims.

I claim:

1. A material spreader comprising a steel channel provided with a bridge and legs, axle bearings carried by said legs, an axle rotatively mounted in said axle bearings and restrained from longitudinal movement, a traction wheel mounted on said shaft and provided with a driving bevel gear, a shaft bearing rigidly supported by said bridge, a shaft rotatively mounted in said shaft bearing, a driven bevel gear meshing with said driving gear mounted on said shaft, a spreader disk mounted on said shaft above said shaft bearing, said driven gear and said disk being in abutting relationship with said shaft bearing to restrain longitudinal movement of said shaft, a pair of members secured to said legs having upwardly and outwardly projecting arms and downwardly and outwardly projecting legs, hopper supports carried by said members, an inverted cone-shaped hopper secured to said supports, a bottom member for said hopper provided with a central opening and a discharge opening, said shaft projecting up through said central opening into said hopper, an eccentric on the upper end of said shaft, radially extending fingers on said shaft above said bottom member and below said eccentric, and an agitator rotatively mounted on said eccentric and provided with upwardly projecting fingers adjacent to but spaced from the wall of said hopper.

2. A material spreader comprising a steel channel provided with a bridge and legs, axle bearings carried by said legs, an axle rotatively mounted in said axle bearings and restrained from longitudinal movement, a traction wheel mounted on said shaft and provided with a driving bevel gear, a shaft bearing rigidly supported by said bridge, a shaft rotatively mounted in said shaft bearing, a driven bevel gear meshing with said driving gear mounted on said shaft, a spreader disk mounted on said shaft above said shaft bearing, said driven gear and said spreader disk being in abutting relationship with said shaft bearing to restrain longitudinal movement of said shaft, a pair of members secured to said legs having upwardly and outwardly projecting arms and downwardly and outwardly projecting legs, hopper supports carried by said members, an inverted cone-shaped hopper secured to said supports, a bottom member for said hopper provided with a central opening and a discharge opening, said shaft projecting up through said central opening into said hopper, an eccentric on the upper end of said shaft, radially extending fingers on said shaft above said bottom member and below said eccentric, an agitator rotatively mounted on said eccentric and provided with upwardly projecting fingers adjacent to but spaced from the wall of said hopper, and a shield carried by said members and positioned adjacent the perimeter of said disk to shield the rear of said spreader and permit said disk to spread material forwardly of said spreader.

3. A material spreader comprising a steel channel provided with a bridge and legs, axle bearings carried by said legs, an axle rotatively mounted in said axle bearings and restrained from longitudinal movement, a traction wheel mounted on said shaft and provided with a driving bevel gear, a shaft bearing rigidly supported by said bridge, a shaft rotatively mounted in said shaft bearing, a driven bevel gear meshing with said driving gear mounted on said shaft, a spreader disk mounted on said shaft above said shaft bearing, said driven gear and said disk being in abutting relationship with said shaft bearing to restrain longitudinal movement of said shaft, a pair of members secured to said legs having upwardly and outwardly projecting arms and downwardly and outwardly projecting legs, hopper supports carried by said members, an inverted cone-shaped hopper secured to said supports, a bottom member for said hopper provided with a central opening and a discharge opening, said shaft projecting up through said central opening into said hopper, an eccentric on the upper end of said shaft, radially extending fingers on said shaft above said bottom member and below said eccentric, an agitator rotatively mounted on said eccentric and provided with upwardly projecting fingers adjacent to but spaced from the wall of said hopper, a semi-circular shield carried by said members and positioned adjacent the perimeter of said disk to shield the rear of said spreader and permit said disk to spread material forwardly of said spreader, and a roof mounted between said wheel and said disk and oppositely related to said shield to protect said wheel from material spread by said disk.

4. A material spreader comprising: a frame having an upper support for a hopper, a lower bridge for supporting a vertical shaft, and depending legs for supporting an axle; a flat bottom hopper carried by said upper support, said flat bottom having a central bearing for a vertical shaft and a valved discharge opening offset from said bearing; a vertical shaft rotatably mounted in said lower bridge and said central bearing and having an upper portion projecting into said hopper and being upsupported above said central bearing; agitating means in said hopper carried by said upper portion; a spreading disk on said shaft below said bottom; a horizontal axle rotatably mounted between said depending legs below said disk; a single traction wheel mounted on said horizontal shaft and disposed to one side of said vertical shaft; and gear means between said wheel and shaft to cause said shaft to rotate as said wheel rotates.

5. A material spreader comprising a hopper having a bottom provided with a valved discharge opening, a bearing in said bottom having a shaft rotatably mounted therein and projecting below and above said bottom, a spreader disc mounted on said shaft below said bottom and rotatable with said shaft for spreading material fed thereto from said valved discharge opening, a small extension eccentrically mounted on the upper end of said shaft within said hopper, and an agitator having a bottom portion freely rotatively mounted on said small extension and having upwardly projecting fingers whereby said agitator will be provided with reciprocal movement with respect to said hopper when said shaft and spreader disc are rotated, said agitator having rotational movement with respect to said hopper when not restrained by material therein.

LEONARD HEIDGER.

REFERENCES CITED

The following references are of record in the file of this patent:

UNITED STATES PATENTS

| Number | Name | Date |
|---|---|---|
| 883,564 | Parrish | Mar. 31, 1908 |
| 922,028 | Parrish | May 18, 1909 |
| 1,965,483 | Woods | July 3, 1934 |
| 2,044,652 | Walker | June 16, 1936 |
| 2,097,102 | Moore | Oct. 26, 1937 |
| 2,334,376 | Bauer | Nov. 16, 1943 |
| 2,451,128 | Thiesse | Oct. 12, 1948 |

FOREIGN PATENTS

| Number | Country | Date |
|---|---|---|
| 1,495 | Australia | Apr. 19, 1926 |
| 99,118 | Germany | Sept. 29, 1898 |
| 281,685 | Italy | Jan. 20, 1931 |